United States Patent [19]
Schoell

[11] Patent Number: 5,566,775
[45] Date of Patent: *Oct. 22, 1996

[54] SKIRTED SURFACE EFFECT VEHICLE

[76] Inventor: Harry Schoell, 2968 SW. 23rd Ave., Fort Lauderdale, Fla. 33312

[*] Notice: The term of this patent shall not extend beyond the expiration date of Pat. No. 5,314,035.

[21] Appl. No.: 248,804

[22] Filed: May 24, 1994

Related U.S. Application Data

[63] Continuation-in-part of Ser. No. 926,312, Aug. 10, 1992, Pat. No. 5,314,035.

[51] Int. Cl.$^6$ .................................. B60V 1/08; B60V 1/11
[52] U.S. Cl. .......................... 180/120; 180/117; 180/119; 180/127; 244/12.1; 114/272
[58] Field of Search ..................................... 180/116, 117, 180/118, 119, 120, 121, 122, 123, 124, 126, 127, 128, 129; 244/12.1, 23 R; 114/272, 273

[56] References Cited

U.S. PATENT DOCUMENTS

| | | | |
|---|---|---|---|
| 3,082,976 | 3/1963 | Dornier | 180/120 |
| 3,190,582 | 6/1965 | Lippisch | 180/117 |
| 3,261,419 | 7/1966 | Kaario | 180/120 |
| 3,908,783 | 9/1975 | Joerg et al. | 180/116 |
| 4,159,086 | 6/1979 | Schonfelder | 180/117 |
| 4,705,234 | 11/1987 | Bourn | 244/12.1 |
| 4,712,630 | 12/1987 | Blum | 180/117 |
| 5,029,548 | 7/1991 | Bernitsyn et al. | 114/272 |

FOREIGN PATENT DOCUMENTS

| | | | |
|---|---|---|---|
| 0023340 | 2/1981 | European Pat. Off. | 180/117 |
| 2540847 | 3/1977 | Germany | 180/117 |
| 0054063 | 3/1991 | Japan | 180/117 |
| 0112765 | 5/1991 | Japan | 180/116 |
| 0159865 | 7/1991 | Japan | 180/117 |
| 4024159 | 1/1992 | Japan | 180/116 |

*Primary Examiner*—Richard M. Camby
*Assistant Examiner*—Peter C. English
*Attorney, Agent, or Firm*—Brooks & Kushman P.C.

[57] ABSTRACT

A surface effect vehicle for traversing a water or ground surface is provided. The surface effect vehicle comprises an elongate body and forward and rear scoops, preferably having a large angle of attack inducing stall conditions on the scoops. Each scoop has an arched leading edge defining, in conjunction with the surface, a forwardly facing opening. Preferably, each scoop also has an opening with a fan mounted therein. Forward and rear skirts are movably mounted relative to the forward and rear scoops. Propulsion apparatus are provided for moving the surface effect vehicle across the surface. When the forward and rear skirts are placed in extended positions covering the forwardly facing openings and the front and rear fans are activated, the surface effect vehicle may be lifted relative to the surface to be traversed. Alternatively, when the forward and rear skirts are placed in their retracted positions and the propulsion apparatus move the surface effect vehicle across the surface, air is forced through the uncovered forwardly facing openings and beneath the scoops to lift the surface effect vehicle from the surface to be traversed.

17 Claims, 4 Drawing Sheets

SKIRTED SURFACE EFFECT VEHICLE

CROSS REFERENCE TO RELATED PATENT APPLICATION

This application is a continuation-in-part of Ser. No. 07/926,312, filed Aug. 10, 1992, now issued as U.S. Pat. No. 5,314,035, entitled Surface Effect Vehicle.

TECHNICAL FIELD

The present invention relates to surface effect vehicles which are capable of riding on a cushion of air over water or ground surfaces.

BACKGROUND ART

Surface effect vehicles are used for moving just above water, ground, or a combination of terrains, making them more efficient than either a water vehicle, like a boat, or a ground vehicle, like an automobile. This is because when a vehicle is in contact with a water or ground surface there is a large coefficient of friction between the vehicle and the surface. However, when a vehicle moves through a medium such as air, the coefficient of friction is substantially reduced. Surface effect vehicles ride on cushions of air just above a surface, like water, wherein the friction-reducing cushion enhances the ability of the surface effect vehicle to move forwardly.

There is an acknowledged difference between flying aircraft and surface effect vehicles. Flying aircraft use the low pressure flow of air over the aircraft wing and the high pressure flow of air beneath the wing to create lift. In contrast, surface effect vehicles use the high pressure of air beneath an air foil to produce a cushion of air between the vehicle and a traversed surface to separate the vehicle from the surface. Forward movement of the surface effect vehicle is from some type of propulsion means.

In essence, surface effect vehicles cannot rise more than a few feet from the surface without redesigning the air foil and providing an elevator. To date, there have been stabilization problems for surface effect vehicles designed to operate both as a boat and as a surface effect vehicle. When departing one medium for another the hydrodynamic and aerodynamic forces on the vehicle are often difficult to control and stabilize. Some vehicles use air flaps on the rear of the vehicle to provide control and stabilization. Such arrangements are found in U.S. Pat. Nos. 3,918,382, 4,151,893 and 4,712,630.

Another problem surface effect vehicles have is that it takes a great deal of power to accelerate the surface effect vehicle to a sufficient speed so that the air pressure beneath the surface effect vehicle will lift the vehicle free of the surface to be traversed. This again is due to the relatively large coefficient of friction between the moving surface effect vehicle and the surface to be traversed as compared to the resistance offered between just air and the vehicle.

The present invention meets the need for a stable surface effect vehicle while also overcoming the problem of freeing the surface effect vehicle from the surface to be traversed.

SUMMARY OF THE INVENTION

It is an object of the present invention to provide a surface effect vehicle which is more stable than prior surface effect vehicles.

It is another object to provide a surface effect vehicle which has forward and rear scoops mounted on an elongated body, each scoop having a reverse delta shape with a trailing apex and a forward opening arch-shaped leading edge. The scoops preferably have angles of attack sufficiently large to induce a stall condition which inhibits the surface effect vehicle from flying.

It is yet a further object to provide a surface effect vehicle having at least one scoop having a skirt movably mounted across a forward opening leading edge and having a fan mounted in the scoop so that the scoop and skirt form a closed region beneath the scoop which can be pressurized by the fan to lift the surface effect vehicle from the surface to be traversed.

Still yet another object is to provide a stable surface effect vehicle which overcomes the parting effect when leaving a medium such as water without any noticeable control effects.

The surface effect vehicle of the present invention preferably has a forward lifting scoop or air foil and a rear, or aft, lifting scoop or air foil attached to an elongate body or hull. The scoop-like air foils are arched to provide large air trapping surfaces for better lift and control. The lifting scoops are ideally arranged with a smaller scoop forward, and a larger scoop aft. The forward scoop provides the initial lift-off and preferably handles at most one-fourth of the total vehicle weight, while the larger aft scoop provides secondary lift-off and a majority of sustained lift. Using two separate lifting scoops creates two separate surface effect pressures with each scoop receiving air pressure to support the vehicle. Ideally, each scoop will have an angle of attack sufficiently large to induce a stall condition to the scoops.

The sharp angle of attack and the ratios of the lifting scoops are advantageous to the stability of the vehicle. For example, the forward scoop ideally has about one-fourth the area of the aft scoop. Also, the body or hull does not contact the surface, such as water, thereby eliminating drag of the body at lift-off. These factors increase the stability of the vehicle during lift-off and sustained lift. There are also louvers in the scoops to regulate height and lift at high speeds.

Another stabilizing feature is non-trip appendages on the tips of each scoop to function as stabilizing skis on lift-off and landing. The non-trip appendages are ideally set at an angle of about 30° to promote lifting during lift-off and landing.

In a second preferred embodiment, a surface effect vehicle for traversing a water or ground surface is provided comprising an elongate body and forward and rear scoops. The elongate body has a forward end and a rear end. The forward and rear scoops are mounted adjacent the forward and rear ends of the body. Each scoop has an arched leading edge and a trailing apex defining, in conjunction with the surface to be traversed, a forwardly facing opening. Ideally, each scoop has a fan opening therein and an angle of attack sufficiently large to induce a stall condition.

Forward and rear skirts are movably mounted relative to the forward and rear scoops between first extended positions covering the forwardly facing openings wherein the scoops and skirts generally seal with the surface to be traversed and second retracted positions wherein the skirts do not cover the forwardly facing openings. Front and rear fans are mounted in the fan openings in the forward and rear scoops for blowing air beneath the front and rear scoops. Also, propulsion means are provided for moving the surface effect vehicle across a surface.

When the forward and rear skirts are placed in their extended positions covering the forwardly facing openings and the front and rear fans are activated, the surface effect vehicle may be lifted from the surface to be traversed. This allows the vehicle to be propelled forwardly without having to overcome frictional resistance between the vehicle and the traversed surface. Or if the vehicle is not lifted completely clear of the surface, at least the frictional resistance is reduced by partially lifting the vehicle relative to the surface.

Thereafter, the forward and rear skirts may be placed in their retracted positions with the propulsion means moving the surface effect vehicle across the surface. Air is forced through the uncovered forwardly facing openings and beneath the scoops to maintain the lift of the surface effect vehicle from the surface to be traversed.

BEST MODES FOR CARRYING OUT THE INVENTION

Figure 1:
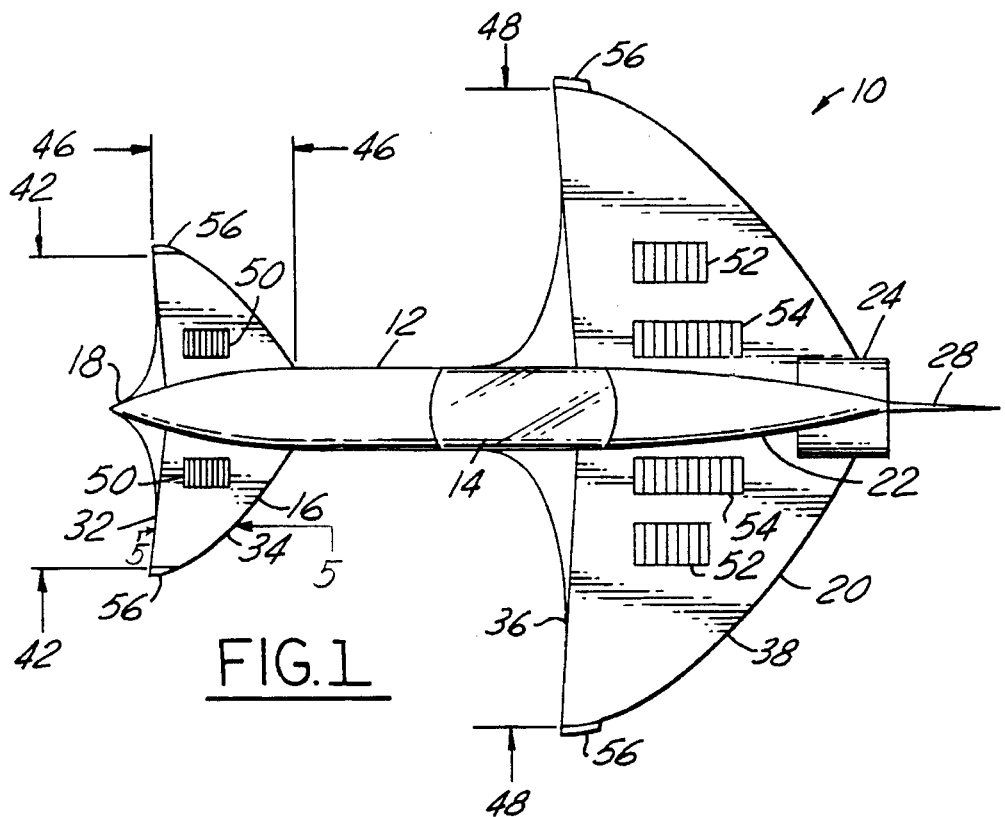
FIG. 1 is a top plan view of a surface effect vehicle made in accordance with a first embodiment of the invention.

Referring to FIGS. 1–6, there is shown a first embodiment of a surface vehicle 10 of the invention comprised of a hull or body 12, having an aerodynamic shape to reduce air resistance and a cockpit 14 streamlined to match the hull shape. A forward lifting scoop or air foil 16, is positioned near the nose 18 of the hull 12, and an aft or rear lifting scoop or air foil 20, is positioned toward the rear 22 of hull 12. The hull 12 is suspended on the lifting scoops 16 and 20 above a ground or water surface to improve stability while reducing drag. A pusher engine 24, with a propeller, is mounted in space 26 behind the cockpit 14. An air deflecting rudder 28 is mounted in the path of forced air from the engine propeller to steer the vehicle. For steering the vehicle on water, a rudder 30 is mounted on the stern of the hull.

Figure 2:
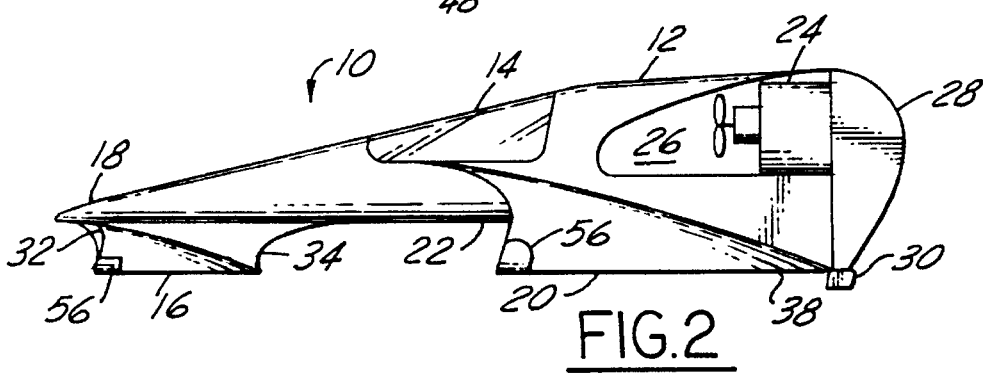
FIG. 2 is a side elevation view of the surface effect vehicle of FIG. 1.
Figure 3:
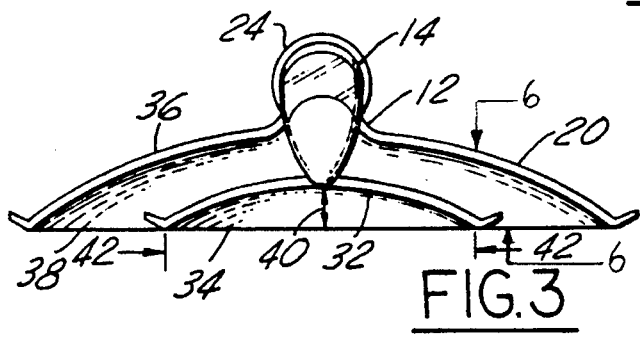
FIG. 3 is a front elevation view of the surface effect vehicle.

Forward lifting scoop 16 and aft lifting scoop 20 have essentially the same design. Both scoops, 16 and 20, have a delta wing shape. While the apex of delta wings in aircraft are generally facing forward, scoops 16 and 20 have their apexes facing rearward. A forward or leading edge 32 on scoop 16 is arched as shown in FIG. 3, to collect air when surface effect vehicle 10 is moving forwardly. A trailing edge 34 on scoop 16 is an arcuate curve in top view and is flat, or parallel, to the horizontal, as shown in FIGS. 2 and 3, to trap air collected under the arched lifting scoop's underside which extends from forward edge 32 to trailing edge 34.

Lifting scoop 16 has an angle of attack which extends from leading edge 32 to trailing edge 34. The most desirable angle is approximately 16° to produce a pressure ramp in front of scoop 16. Aft or rear lifting scoop 20 has the same configuration with a leading edge 36 and a trailing edge 38. This angle of attack will cause a stall effect should the air pressure collected under scoops 16 and 20 become too great and will prevent the vehicle from flying or becoming unstable.

There are certain preferred relationships which dictate the shapes of lifting scoops 16 and 20. The height 40 of a Scoop is ideally one-seventh of its width or beam 42. Scoop length 46 is determined as three-sevenths of its width or beam 42. The dimensions are only shown on lift scoop 16, however, the same relationships, or ratios, apply to lifting scoop 20. Another relationship important to the design of surface effect vehicle 10, is the spacing between forward or leading edges 32 and 36 of scoops 16 and 20 which is ideally four-sevenths of the width of aft scoop 20 or beam 48. These relationships provide improved control and stability over known surface effect vehicles.

Forward lifting scoop 16 has one-half the area of aft lifting scoop 20. The smaller forward lifting scoop 16 provides the initial lift-off of vehicle 10. Accordingly, the smaller size and the forward position of scoop 16 provides less weight to be lifted, and consequently, nose 8 almost immediately lifts off. The angle of attack of scoop 16 increases its efficiency for lift-off; Likewise, once the nose 18 lifts off, the larger aft lifting scoop 20 which is filled with air begins to lift off, carrying the heavier rearward weight of the vehicle.

Figure 4:
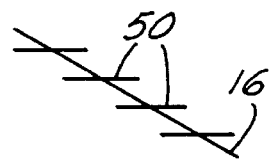
FIG. 4 is a schematic view of a louver of the invention.

FIG. 1 shows lifting scoop 16 with waste louvers 50, and lifting scoop 20 with two pairs of waste louvers 52 and 54. These waste louvers 50, 52 and 54 can be opened automatically or manually to regulate the height that surface effect vehicle 10 maintains over the water or some other surface. Additionally, louvers 50, 52 and 54 prevent instability, or spill lift, at high speeds. The surface effect vehicle may obtain speeds in excess of 85 miles per hour. Having waste louvers reduces the lifting of nose 18 which could create a sudden unstable condition. Also, the same condition exists for the aft lifting scoop 20. Louvers 50 can either work together with, or independently of, louvers 52 and 54. A typical louver 50, shown in FIG. 4, is opened to reduce the lift on one of the scoops.

Figure 5:
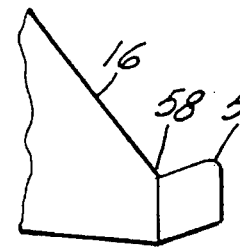
FIG. 5 is a fragmentary view looking along line 5—5 of FIG. 1.
Figure 6:
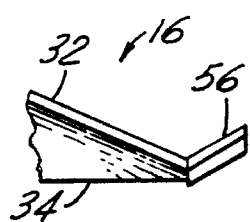
FIG. 6 is a fragmentary view looking along line 6—6 of FIG. 3.
Figure 7:
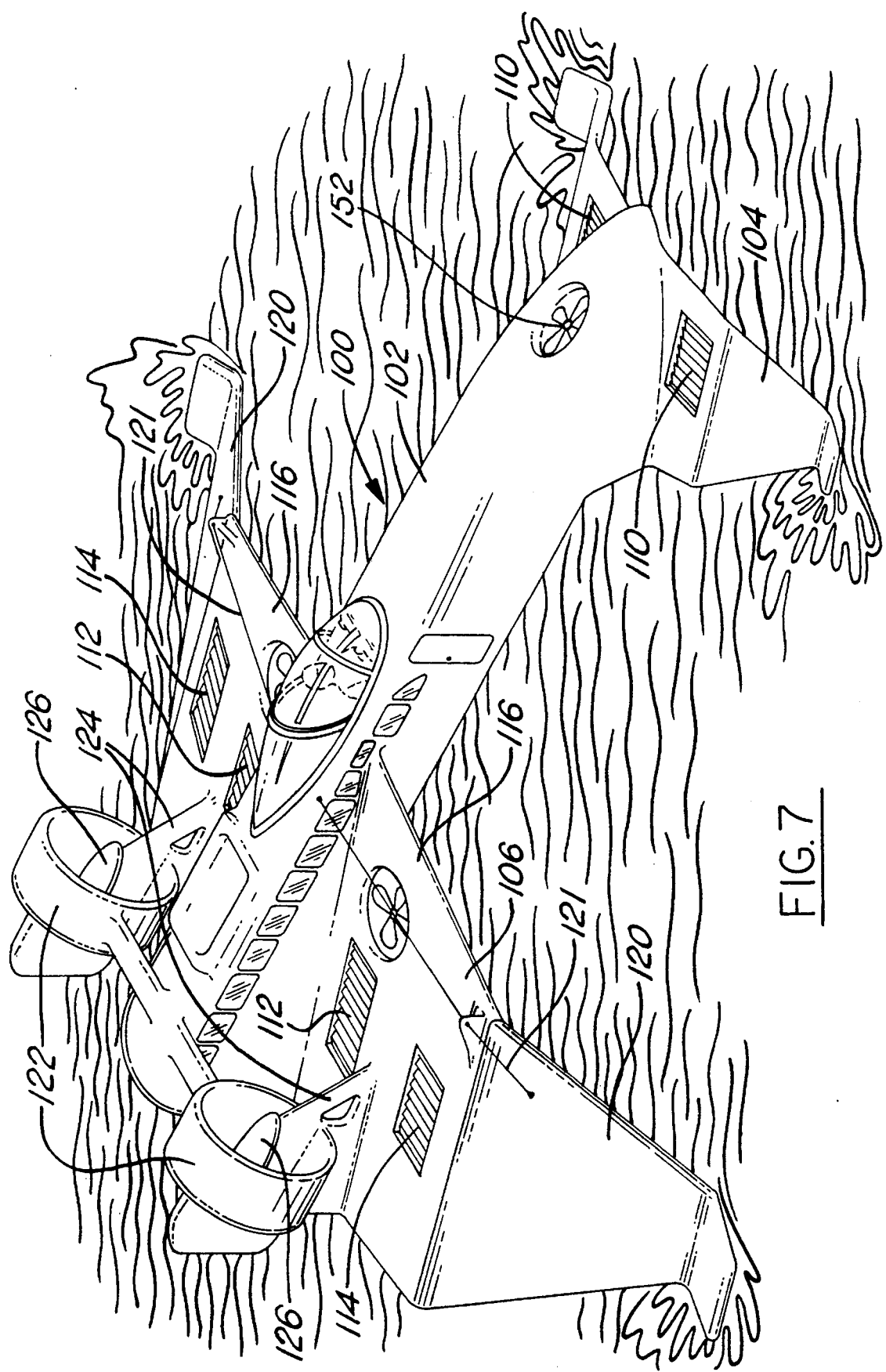
FIG. 7 is a perspective view of a second embodiment of a surface effect vehicle also made in accordance with the present invention.
Figure 8:
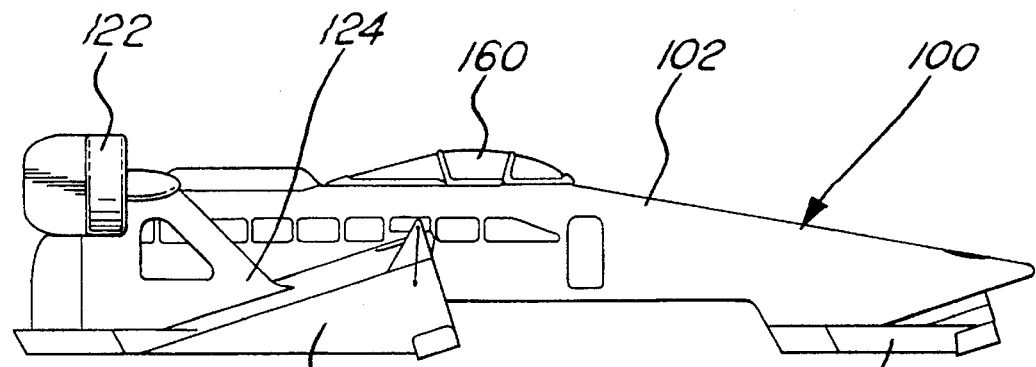
FIG. 8 is a side elevation view of the surface effect vehicle of FIG. 7.

Each of the scoops 16 and 20 has non-trip appendages, or stabilizing skis 56 on each of the tips 58, FIGS. 5 and 6. On lift-off the appendages 56, which are at an angle of 30° to the water or ground surface, function like skis to aid in lift-off. Also, the appendages 56 prevent the tips 58 from "digging" into the water which would trip the scoop tip, thereby losing stability. Flotation is achieved around the perimeter of the scoop.

FIGS. 7–12 show a second embodiment of a surface effect vehicle 100. Surface effect vehicle 100 is similar to the first embodiment, however, it is enlarged and carries a number of passengers. Also, it is designed to more easily lift from a water or ground surface so that the surface effect vehicle 100 can move forwardly with only minimal initial frictional resistance.

Surface effect vehicle 100 has an elongate longitudinally extending main body or hull 102 with attached forward and rear scoops 104 and 106. A pair of waste louvers 110 are mounted in forward scoop 104 on either side of the front end of main body 102. Similarly, rear scoop 106 has a pair of inboard louvers 112 and outboard louvers 114 located lateral to main body 102. Again, louvers 110, 112 and 114 serve to prevent excessive pressure from building up beneath scoops 104 and 106.

Rear scoop 106 has inboard segments 116 affixed to main body 102 and outboard segments 120 which are pivotally or hingedly attached to inboard segment 116. This allows outboard segments 120 to pivot vertically relative,to inboard segments 116 to reduce the total width or beam of surface effect vehicle 100. This is particularly advantageous for transporting surface effect vehicle 100. Cables 121 are attached to outboard segments 120 to effect the pivoting of those outboard segments 120. Cable 121 is reeled in and out by a winch, not shown. Outboard segments 120 may be held in position with respect to inboard segments 116 by retractable pins, also not shown, or cables until outboard segments 120 are to be pivoted inboard during transport.

Figure 11:
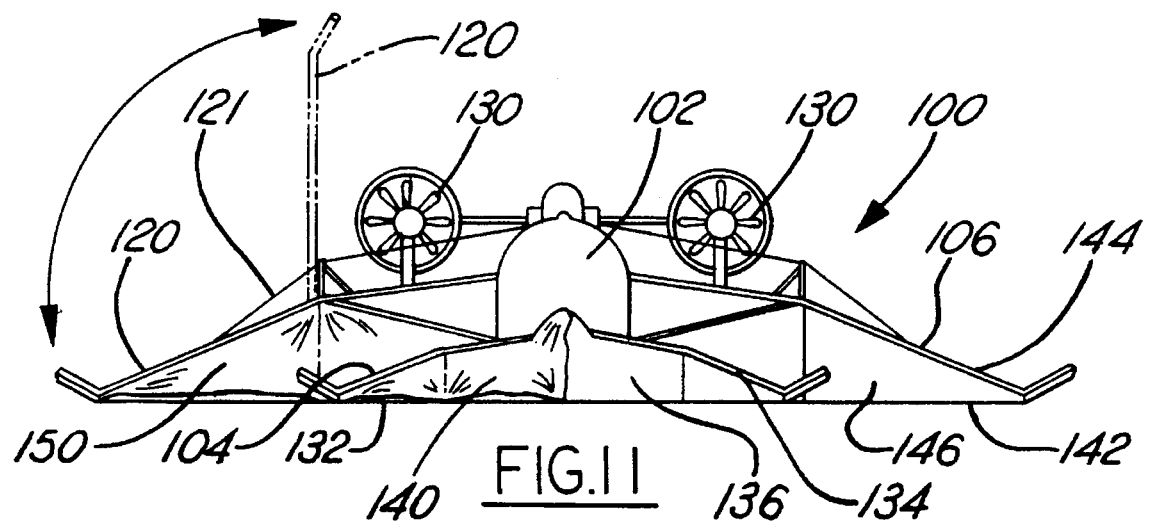
FIG. 11 is a front elevation view of the surface effect vehicle of FIG. 7, partially in cutaway.

Mounted atop each inboard segment 116 is a motor assembly 122. Each motor assembly 122 includes a support 124 affixed to inboard segment 116, an engine 126 which drives a propeller 130, as best seen in FIG. 11. Propeller 130 is driven to provide propulsion in the longitudinal direction. Blades of propeller 130 may be driven forwardly to drive surface effect vehicle 100 forwardly, or else, the propeller may be reversed to move surface effect vehicle 100 in a rearward direction. Also, the amount Of propulsion provided by each propeller 130 can be varied to turn or rotate vehicle 100 in one direction or the other.

Each of forward scoop 104 and rear scoop 106 is again of the reverse delta wing configuration described in the first embodiment and has an angle of attack of 16° to induce a stall condition. As best seen in FIG. 11, forward Scoop 104 has a trailing edge 132 which extends generally parallel with a surface to be traversed, and then scoop 104 rises forwardly to an arched leading edge 134. The ground or water surface and leading edge 134 define a forwardly facing opening 136. A front skirt 140 is hingedly suspended from leading edge 134 to cover front opening 136. Front skirt 140 may be made of a flexible material such as canvas or a fiberglass reinforced plastic. In FIG. 11, skirt 140 is shown on the left half of vehicle 100 in an extended position covering front opening 136. On the right half, skirt 140 is shown in a second retracted position uncovering front opening 136.

Skirt 140 may be captured between leading edge 134 using an elongate clamping plate (not shown) which is periodically bolted to leading edge 134 to effect a seal between skirt 140 and leading edge 134. The flexibility of skirt 140 provides for the hinging action of skirt 140 relative to scoop 104.

Similarly, rear scoop 106 has a trailing rear edge 142 extending parallel with the surface to be traversed. Rear scoop 106 then extends and rises forwardly terminating in a leading edge 144. A front opening 146 is defined between leading edge 144 and the ground or water surface. A rear skirt 150 is hingedly suspended from leading edge 144 covering opening 146. Skirt 150 may be clampingly bolted to leading edge 144 using a clamping strip as well.

Front cables 147 and rear cables 149 are laterally spaced and extend between forward scoop 104 and rear scoop 106 and respective front and rear skirts 140 and 150 so that front and rear skirts 140 and 150 cannot swing or billow too far forwardly, thereby preventing front and rear openings 136 and 146 from becoming uncovered.

Figure 10:
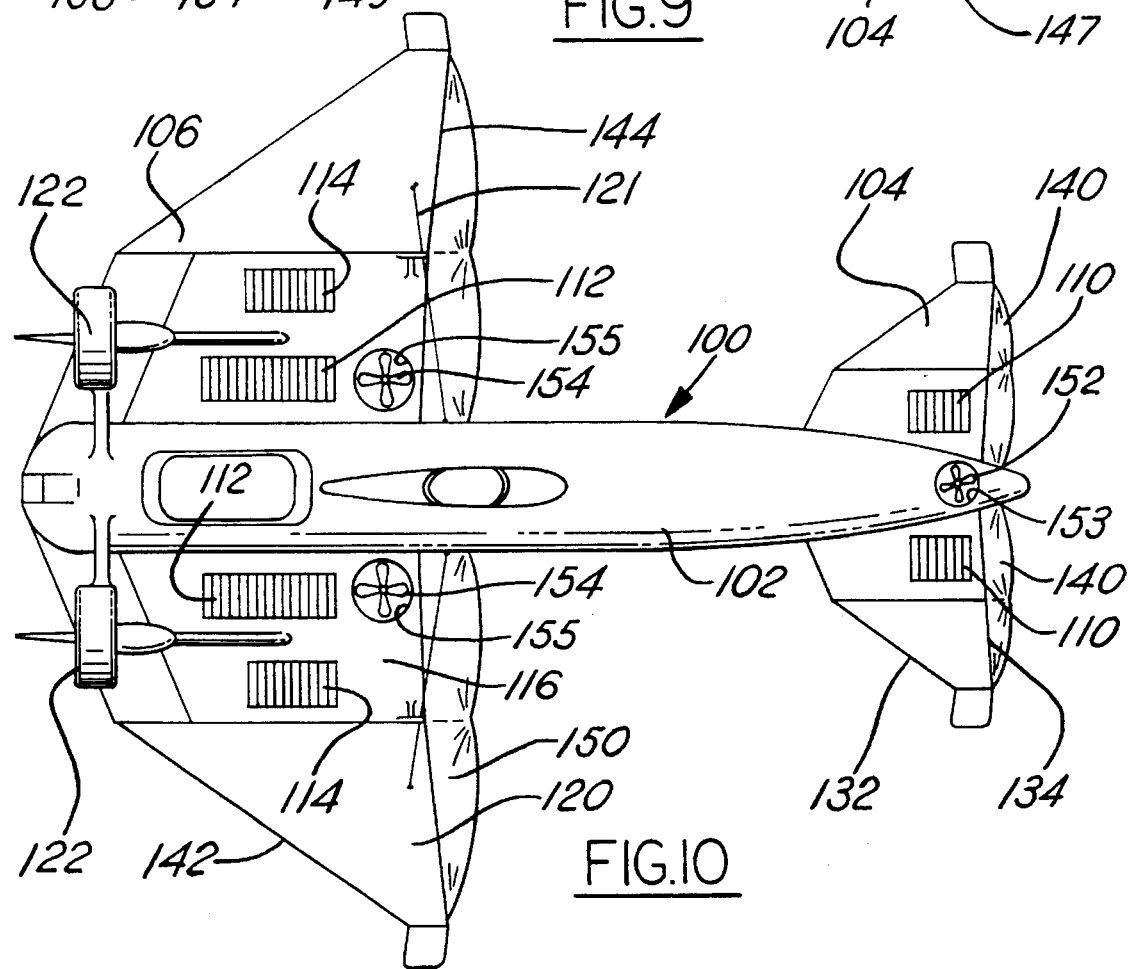
FIG. 10 is a top plan view of the surface effect vehicle of FIG. 7.

Referring now to FIG. 10, a front fan 152 and a pair of laterally spaced rear fans 154 are disposed within openings 153 and 155 in the front end of main body 102 and front scoop 104 and inboard segments 116 of rear scoop 106. Front and rear fans 152 and 154 are aligned such that when the fans are operated, air is drawn through front fan 152 and rear fans 154 to force air within the closed regions bounded by the ground surface and forward scoop 104 and extended front skirt 140 and rear scoop 106 and extended rear skirt 150. When pressurized, these closed regions cause surface effect vehicle 100 to lift relative to the surface to be traversed.

Figure 9:
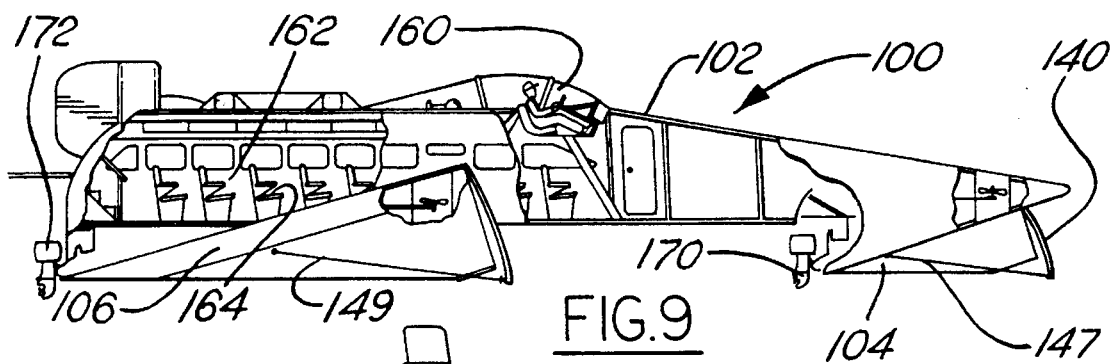
FIG. 9 is a side elevation view, partially in cutaway, of the second embodiment of the surface effect vehicle.

Looking now to FIGS. 9 and 10, front and rear skirts 140 and 150 are allowed to billow slightly forwardly. The pressurized air beneath the scoops is forced to exit beneath the trailing edges 132 and 142 and beneath extended front and rear skirts 140 and 150. This is schematically demonstrated in FIG. 12 where air flows through opening 155 into the closed region and out beneath trailing edge 142 and rear skirt 150.

FIG. 9 illustrates that surface effect vehicle 100 has a cockpit 160 and a passenger compartment 162 having a number of seats 164. Again, cockpit 160 should be streamlined with main body 102.

Front and rear outboard motors 170 and 172, attached to body 102, are used to allow surface effect vehicle 100 to troll through water. When front and rear outboard motors 170 and 172 are not in use, they can be pivoted horizontally out of engagement with the traversed surface. Also, wheels may be provided beneath scoops 104 and 106 and body 102 to allow vehicle 100 to roll across a ground surface.

In operation, front fan 152 in the front end of main body 102 and rear fans 154 in rear scoop 106 are activated to blow air and pressurize beneath forward and rear scoops 104 and 106. This causes front and rear skirts 140 and 150 to billow forwardly with air passing beneath trailing edges 132 and 142 of front and rear scoops 104 and 106 and extended front and rear skirts 140 and 150. Cables 147 and 149 prevent skirts 140 and 150 from swinging forwardly and uncovering forwardly facing openings 136 and 146. This localized region of increased pressure causes surface effect vehicle 100 to lift relative to the water or ground surface. Accordingly, there is little frictional resistance between surface effect vehicle 100 and the ground or water surface.

Figure 12:
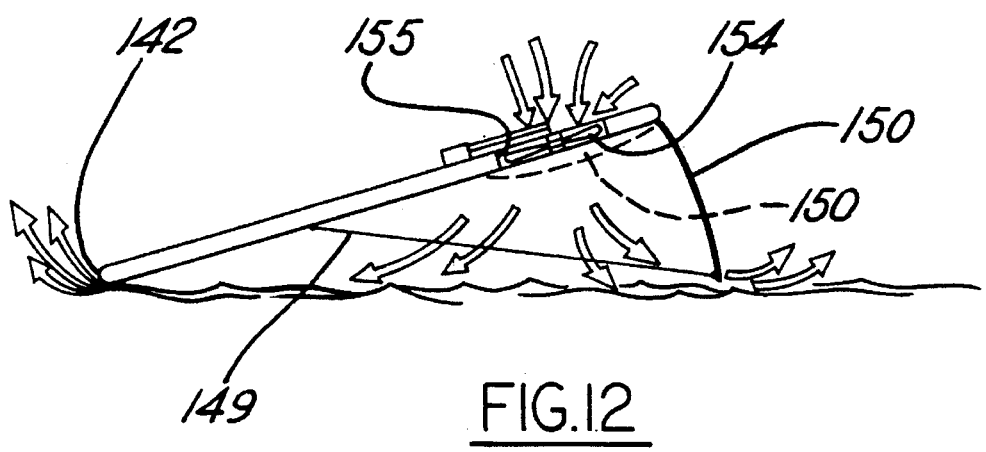
FIG. 12 is a schematic view of air being forced beneath a scoop to vertically lift the scoop from the surface.

Once surface effect vehicle 100 is lifted relative to the surface, propellers 130 are driven by engines 126 to effect forward movement of surface effect vehicle 100 with respect to the surface. Upon reaching a sufficient speed, front and rear fans 152 and 154 are deactivated allowing front and rear skirts 140 and 150 to freely swing rearwardly as air is driven beneath front and rear scoops 104 and 106. Skirts 140 and 150 are designed to fold back and cover fan openings 153 and 155 to prevent air from escaping therethrough when surface effect vehicle 100 is moving forwardly at a sufficient speed. FIG. 12 schematically illustrates skirt 150 in its extended and, in phantom retracted positions.

When surface effect vehicle 100 is to be stopped, propellers 130 are deactivated and front and rear fans 152 and 154 are again activated. This causes front and rear skirts 140 and 150 to extend forwardly creating the closed regions between front and rear scoops 104 and 106 and the ground surface. Front and rear fans 152 and 154 can then be slowed to allow the surface effect vehicle 100 to gently rest upon the ground or water surface.

While the foregoing specification of this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

For example, although not preferred, the invention could be altered to provide a single scoop having a skirt thereon and a fan in the scoop to pressurize beneath the scoop.

What is claimed is:

1. A surface effect vehicle for traversing a water or ground surface, the surface effect vehicle comprising:

an elongate body having a forward end and a rear end;

forward and rear scoops mounted adjacent the respective forward and rear ends of the body, each scoop having an angle of attack sufficiently large to cause a stall effect on the scoop during normal operation transversing the surface and having an arched leading edge defining, in conjunction with the surface, a forwardly facing opening and each scoop having a fan opening therein;

forward and rear skirts movably mounted relative to the forward and rear scoops between first extended positions covering the forwardly facing openings wherein the scoops and skirts generally seal with the surface to be traversed and second retracted positions wherein the skirts do not cover the forwardly facing openings;

pressurizing apparatus in communication with the respective fan openings in the forward and rear scoops for blowing air beneath the forward and rear scoops;

propulsion means for moving the surface effect vehicle across the surface;

wherein when the forward and rear skirts are placed in their extended positions covering the forwardly facing openings and the pressurizing apparatus is activated, the surface effect vehicle may be lifted from the surface to be traversed; and wherein when the forward and rear skirts are placed in their retracted positions and the propulsion means moves the surface effect vehicle across the surface, air is forced through the uncovered forwardly facing openings and beneath the scoops to lift the surface effect vehicle from the surface being traversed while the stall effect on the scoops limits lift and enhances stability.

2. The surface effect vehicle of claim 1 wherein:

each scoops includes an inboard segment affixed to the body and an outboard segment pivotally attached to the inboard segment so that the outboard segment may fold inboard.

3. The surface effect vehicle of claim 1 wherein:

at least one of the skirts retracts to cover the fan opening in one of the forward or rear scoops to seal that fan opening.

4. The surface effect vehicle of claim 1 further comprising:

at least one cable connecting between one of the forward or rear skirts and one of the scoops or the body to prevent that skirt from blowing forwardly and uncovering one of the forwardly facing openings.

5. The surface effect vehicle of claim 1 further comprising:

at least one louver disposed in one of the forward or rear scoops to control the exhaust of air through that one of the forward or rear scoops.

6. The surface effect vehicle of claim 1 wherein:

at least one of the scoops is generally non-cambered.

7. A method of transporting a surface effect vehicle across water or a ground surface, the method comprising:

closing a skirt across a forwardly facing opening on a scoop to form a closed region between the scoop, the skirt and the surface to be traversed, the scoop having a sufficiently large angle of attack to induce a stall effect on the scoop during normal forward travel;

pressurizing the closed region to lift the scoop relative to the surface; and propelling the surface effect vehicle forwardly across the surface and retracting the skirt to open the forwardly facing opening with air being rammed beneath the scoop to lift the surface effect vehicle with the scoop inducing a stall effect thereon to stabilize the vehicle.

8. The method of claim 7, wherein:

pressurizing the closed region includes activating a fan located in an opening in the scoop to pressurize beneath the scoop; and the retracting of the skirt is accompanied by sealing the fan opening to prevent air from passing through the scoop.

9. A surface effect vehicle for traversing water or ground surface, the surface effect vehicle comprising:

a body with a nose section, a cockpit and an aft section;

a pair of lifting scoops mounted on the body, the pair of lifting scoops including a forward scoop mounted on said nose section and a rear scoop mounted on said aft section;

said forward scoop and said rear scoop each having an arched leading edge facing forwardly defining, in conjunction with the surface to be traversed, a forwardly facing opening, each scoop having an angle of attack sufficiently large to induce a stall effect thereon when the surface effect vehicle is moving forwardly in normal operation;

the body being supported on the forward scoop and the rear scoop above a surface when the forward and rear scoops are in contact with the surface; and an engine with a propeller mounted on the body to move the surface effect vehicle;

wherein said forward and rear scoops collect air thereunder when the surface effect vehicle is propelled forwardly to allow said vehicle to move on a cushion of air with the stall effect of the scoops assisting in maintaining the stability of the surface effect vehicle.

10. The surface effect vehicle of claim 9 wherein:

the forward scoop has a smaller area than the rear scoop to provide initial lift of said nose section.

11. The surface effect vehicle of claim 9 further comprising:

at least one skirt movably mounted relative to one of the forward or rear scoops to cover and uncover one of the forwardly facing openings.

12. The surface effect vehicle of claim 9 further comprising:

a skirt extending from one of the lifting scoops to the surface to be traversed to cover one of the forwardly facing openings; and means for pressurizing a region bounded by the one of the lifting scoops, and the skirt to lift the vehicle from the surface.

13. The surface effect vehicle of claim 10 wherein:

at least one of the forward and rear scoops has a waste louver which can be opened automatically or manually to regulate the height the surface effect vehicle maintains over the surface when the surface effect vehicle is lifted thereabove.

14. The surface effect vehicle of claim 9 wherein:

at least one of the scoops is generally non-cambered.

15. The surface effect vehicle of claim 9 wherein:

both scoops are generally non-cambered.

16. A surface effect vehicle for traversing water or a ground surface, the surface effect vehicle comprising:

a body and a scoop supported on the body, the scoop having a fan opening therein;

the scoop having a an arched leading edge facing forwardly defining a forwardly facing opening and having an angle of attack sufficient to create a stall effect when the vehicle is moving forward in normal operation;

a skirt movably mounted relative to the scoop between a first extended position covering the forwardly facing opening wherein the scoop and skirt may seal with the surface to be traversed and a second retracted position wherein the skirt does not cover the forwardly facing opening;

a fan in communication with the opening in the scoop for blowing air beneath the scoop; and propulsion means for moving the surface effect vehicle transversely across the surface;

wherein when the skirt is placed in its extended position covering the forwardly facing opening and the fan is activated, the surface effect vehicle may be lifted from the surface to be traversed; and wherein when the skirt is placed in its retracted position and the propulsion means moves the surface effect vehicle across the surface, air is forced through the uncovered forwardly facing opening and beneath the scoop to lift the surface effect vehicle from the surface being traversed with the stall effect created by the scoop assisting in providing vehicle stability.

17. A surface effect vehicle for traversing a water or ground surface, the surface effect vehicle comprising:

an elongate body having a forward end and a rear end;

forward and rear scoops mounted adjacent the respective forward and rear ends of the body, each scoop having an arched leading edge defining, in conjunction with the surface, a forwardly facing opening and each scoop having a fan opening therein;

forward and rear skirts movably mounted relative to the forward and rear scoops between first extended positions covering the forwardly facing openings wherein the scoops and skirts generally seal with the surface to be traversed and second retracted positions wherein the skirts do not cover the forwardly facing openings, at least one of the skirts is retractable to cover the fan opening in one of the forward or rear scoops to seal that fan opening;

pressurizing apparatus in communication with the respective fan openings in the forward and rear scoops for blowing air beneath the forward and rear scoops;

propulsion means for moving the surface effect vehicle across the surface;

wherein when the forward and rear skirts are placed in their extended positions covering the forwardly facing openings and the pressurizing apparat us is activated, the surface effect vehicle may be lifted from the surface to be traversed; and wherein when the forward and rear skirts are placed in their retracted positions and the propulsion means moves the surface effect vehicle across the surface, air is forced through the uncovered forwardly facing openings and beneath the scoops to lift the surface effect vehicle from the surface being traversed.

* * * * *